Nov. 4, 1969   V. E. HENLEY   3,476,633
TIRE BUILDING DRUM
Filed April 8, 1966   2 Sheets-Sheet 1

INVENTOR
Virgil E. Henley
BY Frank J. Earnheart
James A. Lucas
ATTORNEYS

INVENTOR
Virgil E. Henley
Frank J. Eanheart
BY James A. Lucas
ATTORNEYS

United States Patent Office 3,476,633
Patented Nov. 4, 1969

3,476,633
TIRE BUILDING DRUM
Virgil E. Henley, Akron, Ohio, assignor to The General Tire & Rubber Company, a corporation of Ohio
Filed Apr. 8, 1966, Ser. No. 541,387
Int. Cl. B29h 17/16
U.S. Cl. 156—415                                4 Claims

ABSTRACT OF THE DISCLOSURE

An axially adjustable flat band building drum is improved by covering the surface thereof with a relatively thick, sectioned rubber sleeve, the edges of which are clamped to segments of special construction which form the shoulders of the drum. The width of the sleeve can be changed by interchanging a center portion of the sleeve with one of a different size to accommodate for changes in the width of the drum.

BACKGROUND OF THE INVENTION

Tire building drums utilizing rows of segments to form the cylindrical contour of the drum are old in the art. An example of one of these prior art drums is shown in Kraft patent, U.S. 2,614,952. In this machine two rows of segments are disposed in circular fashion an equal distance from the center line of a tire building drum. Each of the segments is composed of a flat portion having its surface exposed to the cylindrical surface of the drum and a pair of copending, radially inwardly directed legs terminating in loops. These segments are positioned with their edges abutting one another, and garter springs or other resilient means are disposed in the loops to urge the segments radially inwardly. Annular inflatable bladders are located in contact with the inside surface of the segments, and when inflated urge the segments radially outwardly thereby increasing the diameter of the drum.

The drum, when contracted to its smallest diameter, is typically smaller than the inner diameter of the inextensible bead rings which are incorporated into the tire. However, the diameter of the drum, when expanded, is larger than that of the bead ring. The edge of the drum thereby forms a shoulder against which the inextensible bead is placed. The two rows of segments are spaced apart from one another and are connected to appropriate means to vary the distance between said segments, thereby permitting the drum set to be altered to accommodate different size tires. Axially flat, arcuate gap shields of spring steel or the like are disposed around the outside surface of the segments and serve to span the gap between the two rows, thereby providing a relatively solid cylindrical surface against which the various stitching operations can be performed. Hooks or other means are provided on the radially inner surface of these shields and resilient means, such as an elastomeric band or a garter spring, are disposed in said loops to retain said gap shields tightly against said segments and to cause said shields to radially contract when the bladders underneath said segments are deflated.

Means were provided on this Kraft drum for folding carcass plies around the inextensible bead rings and over the shoulders of the tire, said means comprising a multiplicity of fingers, each attached to corresponding links which were in turn pivotally engaged with an axially movable support. These fingers could each be actuated to cooperatively fold the fabric tightly around the bead ring after which a stitching mechanism of typical design was brought to bear against the edges of the fabric to stitch them into place.

A recent improvement to this machine is described in U.S. 3,171,769, of which the present inventor was a co-inventor, and consists of a pair of annular inflatable turn-up bladders which replace the fingers and links on the aforedescribed machine. These inflatable turn-up bladders are used in conjunction with a pair of annular bead ring carriers and sleeves, the latter being larger than the maximum diameter of the tire building drum. In constructing a tire on this improved apparatus, a plurality of carcass plies are disposed around the cylindrical building drum with their ends overlapping the drum onto the annular turn-up bladders. The diameter of the drum is then increased to form a pair of shoulders at the sides of the drum, after which inextensible bead rings are placed against said shoulders. The turn-up bladders are then inflated to urge the edges of the fabric into tight engagement with the radially inner and axially outer surface of the bead rings, after which the pair of annular sleeves move from a position axially remote from the tire building drum into a position over the tire building drum concurrently with the release of air from said turn-up bladders. The sleeves push the bladders, and with them the edges of the tire carcass fabric, over the shoulders of the building drum. The bladders collapse against the building drum thereby tightly adhering the edges of the fabric against the carcass on the building drum. These edges are thereafter stitched into place.

The segments used in the construction of these building drums abut one another in edgewise relationship when the drum is in its radially collapsed position. Upon radial expansion of the drum a slight gap is left between each segment. This is usually corrected by providing a thin elastomeric sleeve secured around the outside surface of the building drum. This type of construction still has some drawbacks, among them the fact that as the drum diameter is increased, the radial stretching of the elastomer causes the same to contract axially, thereby exposing a portion of the segments in the vicinity of the shoulders of the drum. This could cause air entrapment in the bead portion of the tire when the plies are being folded around the bead ring. The inclusion of air between carcass plies often results in ply separations and incipient tire failure. A further drawback is that it is difficult to control drum uniformity and diameter when using a thin elastomeric sleeve to cover the segments of the prior art design. Still another drawback is that the drum set (the distance between the shoulders of the drum) cannot be readily varied without the necessity of removing and replacing the thin elastomeric sleeve comprising the surface of the drum.

BRIEF DESCRIPTION OF THE INVENTION

It is one object of this invention to provide an improved flat band building drum having a more precise diameter than drums which have heretofore been produced.

Another object is the provision of a new arrangement of segments and an elastomeric band which permits rapid adjustment of the drum set.

Still another object is the use of a sectioned elastomeric band disposed around the surface of a tire building drum and having its edges securely clamped to the rigid tire building drum segments.

These and other objects are accomplished in the manner to be hereinafter described, with particular reference to the drawings in which.

DETAILED DESCRIPTION OF THE INVENTION

This invention relates primarily to a new functional design for the segments of a flat band tire building drum, as well as to a novel circumferential elastomeric sleeve or band adapted to cover the rotary surface of the drum. The segments are adapted to function in the same manner as those of the prior art, and in addition have means for forming the shoulder portions of the drum and for securing the edges of the elastomeric sleeve.

Figure 1:
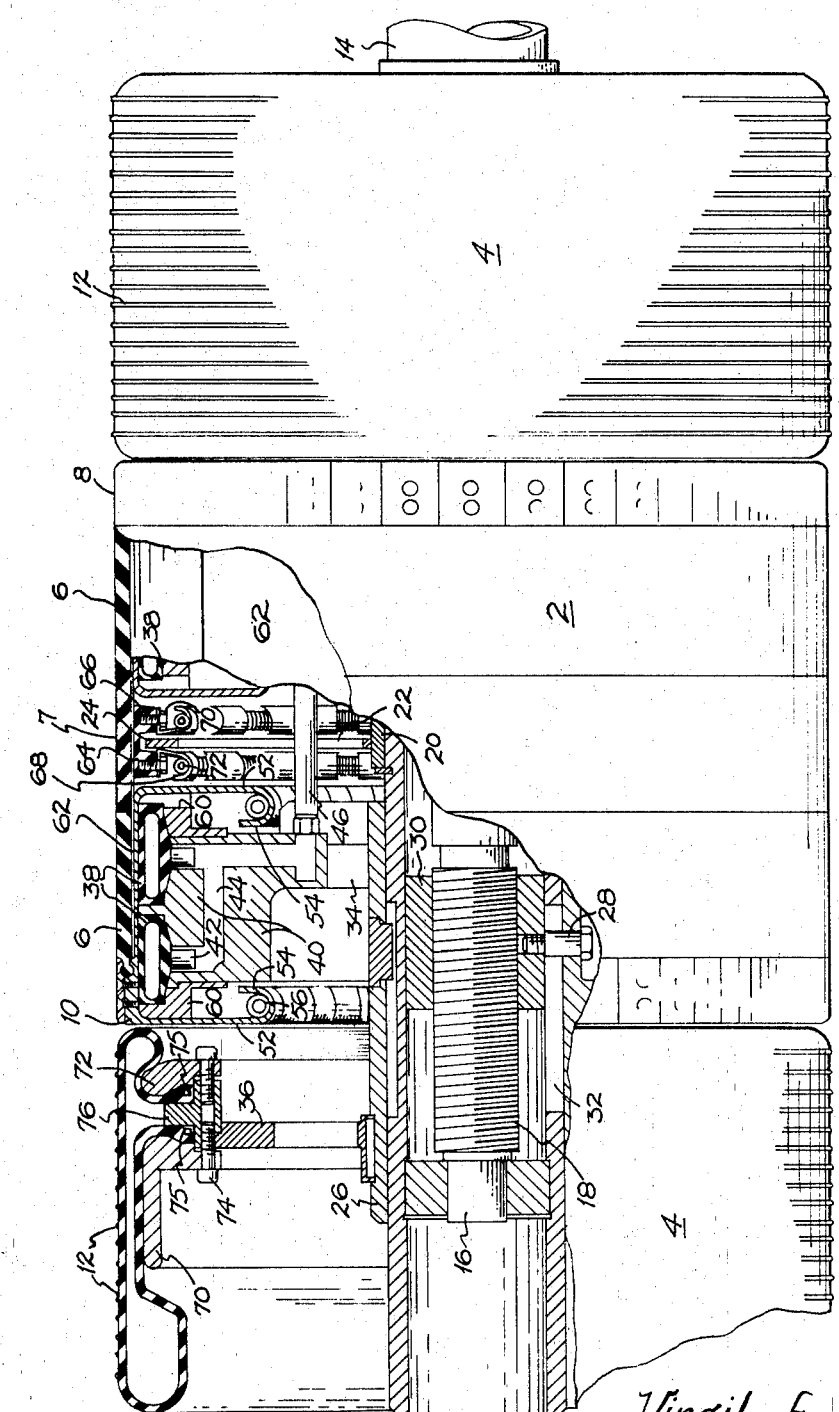
FIGURE 1 is an elevation, partly in cross section, of a tire building drum embodying the improvement of the present invention.

Referring now to FIGURE 1, a partial cut-away view of a carcass building drum is shown having a substantially cylindrical surface comprising a body portion 2 and annular tubular extensions 4. The surface of the body portion 2 consists of a relatively heavy elastomeric sectionalized sleeve lying between two rows of rigid projections 8 forming an integral part of the tire building drum segments 10. The sleeve consists of a pair of end strips 6 and a removable center strip 7 held in contiguous relationship between the end strips. The annular extensions 4 are composed of ply turn-over bladders. When carcass plies are disposed about the building drum, they are arranged in such a manner that their edges terminate near the middle of the turn-up bladders. These bladders cooperate with bead ring carriers and push-over sleeves (not shown) to fold the edges of carcass plies about appropriately positioned bead rings. The details of the construction and operation of the bladders, carriers, and sleeves are more fully explained and described in the aforementioned U.S. Patent 3,171,769. It should be noted that each of the bladders is provided with a plurality of circumferentially extending ribs 12, these ribs serving to grip the edges of the carcass plies during the turn-up operation.

The tire building drum is mounted on a tubular drum shaft 14 which is horizontally supported and is adapted to be rotationally driven by suitable means such as a motor. The motor, as well as various pneumatic and electrical equipment, is preferably contained in an appropriate housing which also contains means for supporting one end of the drum shaft. A screw shaft 16 is centrally positioned within said drum shaft 14 and is provided with two sets of threads, one of which is shown, the pitch of one set being opposite to that of the other. The two sets are symmetrically positioned relative to the center line of the drum. Suitable means such as a clutch (not shown) is provided for simultaneous rotation of the drum shaft 14 and screw shaft 16 when the clutch is engaged, and for rotation of the screw shaft 16 independently of the drum shaft 14 when disengaged. A center hub 20 is welded or otherwise secured to said drum shaft 14 and contains a plurality of spokes 22 extending radially outwardly thereof, terminating in a rim 24.

Disposed on either side of the hub 20 are quills 26 adapted to move on drum shaft 14 in an axial direction toward or away from one another. These quills are attached by bolts 28 to traverse nuts 30 threaded on said screw shaft 16. The hollow drum shaft 14 is provided with slot 32 through which said bolts 28 extend. When the drum shaft 14 is stationary, rotation of the screw shaft 16 causes the traverse nuts 30 to move toward or away from one another, and this movement is transmitted to quills 26. Projecting radially outwardly and securely attached to each of said quills 26 is an inner support 34 for a pair of drum expanding bladders 38 and an outer support 36 for turn-up bladders 12.

Figure 2:
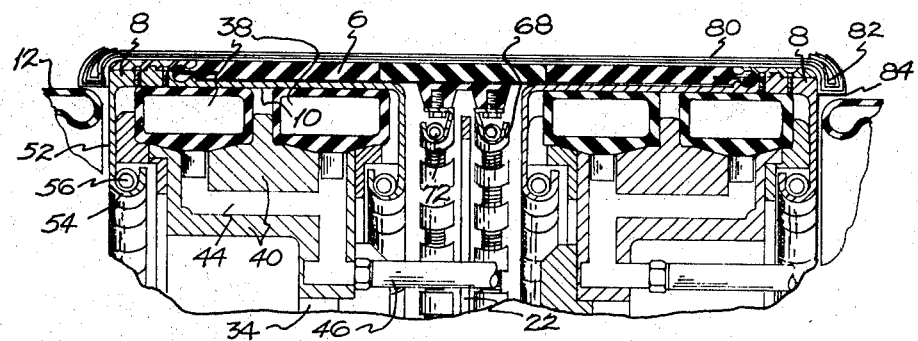
FIGURE 2 is a partial cross section of a drum in its radially expanded position and with a portion of a tire carcass shown thereon.

Each of the drum expanding bladders 38 comprises a radially reinforced tubular inflatable member extending circumferentially around the drum radially inside of the segments 10. When deflated, the bladders 38 lie flat against the flanges 40 comprising an integral part of the supports 34. Each bladder is provided with an air inlet 42 connected by a passageway 44 and conduit 46 to a source of pressurized air. When inflated, these bladders 38 serve to increase the diameter of the building drum as shown in FIGURE 2.

The outer surface of each of the drum expanding bladders 38 is in contact with a row of segments 10, each row being spaced an equal distance from the axis and from the center hub 20 of the drum. The segments are composed of relatively rigid, preferably metal elements which are relatively elongated in comparison to their width and which cooperatively define a substantially cylindrical surface. Each segment has two parallel legs 52 extending radially inwardly and terminating in loops 54. These loops cooperatively define a pair of channels or grooves in which resilient restraining means such as a garter spring 56 are positioned. These garter springs serve to retain the segments radially inwardly in abutting contact with the radially outer surface of flange 40. When the segments are in this position their edges are in essentially abutting relationship with one another. The legs 52 of said segments are tapered slightly so that the loops 54 are narrower in width than the segments themselves to compensate for the fact that these legs are located on a smaller diameter than that of the outer surface of the segments.

When the drum expanding bladders 38 are inflated, the two rows of segments are biased radially outwardly, this biasing movement being limited by contact of the loops 54 against a pair of shoulders 60. The bladders are preferably connected in parallel to the source of pressurized air so that they are all inflated simultaneously thereby causing both rows of segments to move conjointly.

A plurality of overlapping arcuate gap shields 62 are disposed circumferentially around the drum radially outside of, and bridging the gap between, said rows of segments. These gap shields are preferably made of spring steel or the like and cooperate with the segments to provide a solid backing for the elastomeric sleeve for purposes of carrying out the various stitching operations on the tire carcass. Bonded to the underside of each gap shield is a rubber block 64. Two clips 68 are secured to the block by two short bolts 70 threaded into a pair of studs 66 which are molded into the block. A garter spring 72 is disposed within the groove 73 formed by a row of cooperating clips and serve to maintain the gap shields 62 radially inwardly. The radial inward movement of the shields is limited by contact of the drum segments with the flange 40.

The overlapping gap shields 64 are adapted to slide over one another. The operation of gap shields of this type are explained in detail in U.S. Patent 2,979,110 by the present inventor. These shields permit the width of the drum to be varied within relatively wide limits while yet maintaining a solid support between the two rows of segments.

Each turn-up bladder 12 rests upon an annular flange 70 forming an extension of outer support 36. The bead portions of these bladders are securely held between this flange 70 and a clamping ring 72 by suitable means such as bolt 74. A spacer 76 between the two beads serves to keep them apart and to permit air to be introduced and exhausted from the bladder through a suitable passage (not shown).

In the construction of a pneumatic tire, by the flat band process, a plurality of carcass plies are wrapped around the building drum with their edges overlapping the drum and extending out over a portion of the deflated turn-up bladder. Air is introduced into expanding bladders 38 to inflate the same thereby urging the segments 10, gap shields 64, and elastomeric sleeve 6 radially outwardly to form a shoulder at either side of the drum. A pair of inextensible bead rings, having an inner diameter which is smaller than that of the expanded drum but larger than the drum in its collapsed position, are placed against the shoulders, after which the ends of the carcass plies are folded up and around the bead rings and are stitched down against the carcass. When thus completed, the green tire is similar in appearance to that shown in FIGURE 2, wherein like numbers are used to designate the same components as those shown in FIGURE 1. The various carcass plies 80, typically characterized as individual sheets of rubberized fabric, are wrapped around bead rings 82 to form the bead portion 84 of the tire. Although FIGURES 1 and 2 show a pair of inflatable turn-up bladders, other prior art means may be used in conformity with the teachings of the present invention for positioning the bead rings and folding the ends of the carcass plies therearound. For example, this operation can be performed by hand or, alternatively, can be carried out by using mechanically actuated fingers such as described in the aforesaid Kraft patent.

Figure 3:
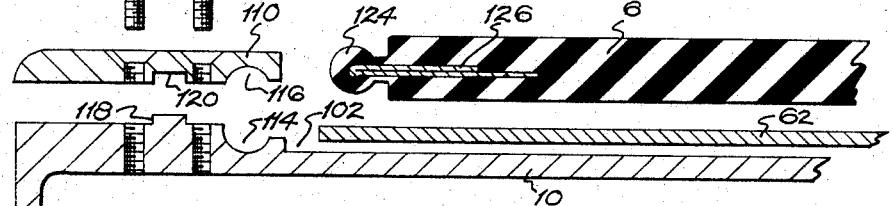
FIGURE 3 is an enlarged exploded view of a preferred arrangement for clamping an edge of the elastomeric band to a segment.

Referring now to FIGURE 3, there is shown a close up of a portion of one of the segments, a gap shield, and a thick elastomeric sleeve prior to assembly. The segment 10 generally comprises a relatively long, substantially narrow strip of metal having a planar portion 102 along which gap shield 62 slides. A pair of legs 52 (one of which is shown) extend normal to the planar portion of the gap shield and terminate in loops 54 as before described. The shoulder portion of the segment comprises a detachable cap 110 which is adapted to be secured to the body of the segment by a pair of flat head screws 112. Projection 118 and slot 120 serve to insure proper alignment of the cap. A groove 114 in the segment cooperates with a groove 116 in the cap to form a clamp. The thick rubber sleeve 6 is molded so as to provide a circular edge portion 124 which is adapted to be securely held between the two grooves when the cap is attached to the segment. The circular edge portion 124 is preferably reinforced with fabric 126; for example, nylon or the like, to strengthen that portion of the sleeve and the thin neck interconnecting it with the body of the sleeve.

The elastomeric sleeve is of uniform thickness throughout and is preferably between about ⅜″ and about ⅝″ thick. If a heavier sleeve is used, it becomes increasingly difficult for the expanding bladders to radially stretch the elastomer while expanding the drum. Furthermore, it becomes difficult to exert heavy stitching pressures against the building drum because of the cushioning effect of the elastomer. A thinner sleeve, on the other hand, may become overworked and become permanently elongated. It then no longer forms a tight fit on the drum. Also, there is a decrease in strength of that portion of the sleeve which is clamped or otherwise secured to the segments.

Figure 4:
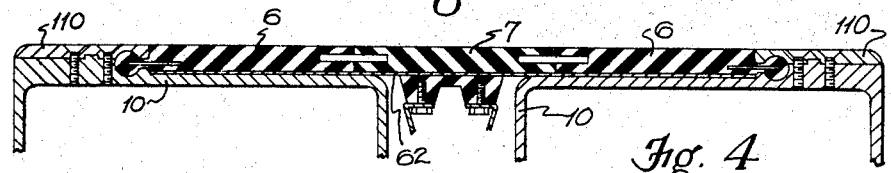
FIGURE 4 is a cross section of a three-piece elastomeric band assembled between two rows of segments on a drum having a given drum set.
Figure 5:
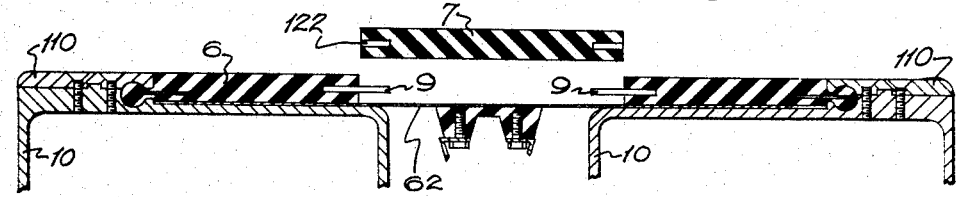
FIGURE 5 is a cross-sectional view of the drum shown in FIGURE 4 after the width of the drum has been increased to accommodate a larger tire carcass, the thick elastomeric sleeve being shown with a wider filler strip prior to assembly.

Referring now to FIGURES 4 and 5, it can be seen that when the elastomeric sleeve is clamped into place, between the two rows of projections, there is no tendency for the end portions 6 of the sleeve to pull away from the edges of the drum when the drum is radially expanded. This serves to overcome one of the faults of prior art building drums wherein the thin elastomeric sleeve tends to contract in width upon expansion of the drum, said fault sometimes leading to the inclusion of air in the bead portion of the tire during the construction thereof.

The use of an interchangeable center strip in the rubber sleeve has the further advantage that the drum set, i.e., the width of the drum, can be varied without changing the entire rubber sleeve by the mere expedient of removing the center strip and replacing it with another strip of greater or lesser width. Thus, when it is contemplated that the drum set is going to be changed, the screw shaft is rotated to drive the segments apart a sufficient distance so that the center strip can be slipped free of the pins 9 and can be removed. The replacement strip is then slipped into place with its pin holes 122 aligned with pins 9 and the screw shaft again rotated to bring the segments together and to slide the end strips into contiguous relationship with the center strip. Because the center strip is relatively elastic, it is easily slipped over the drum into place.

Another advantage of this particular invention is the fact that the drum can be accurately dimensioned; for instance, in the following manner. After the drum segments are all assembled, the drum is put in a lathe and the segment projections, i.e., the caps, are machined down to the proper diameter. The thick elastomeric sleeve is molded in one piece on a suitable mandrel. The dimensions of the sleeve as it is removed from the mold are slightly thicker than needed, and while the sleeve is still on the mandrel, it is machined down to the proper thickness and circumference using a special type of grinder to remove the excess rubber. The sleeve is then cut circumferentially into the number of intended sections and holes are drilled axially into the abutting edges of the sections, said holes to receive aligning pins. The sleeve is then assembled onto the building drum.

Although the invention has been illustrated utilizing pins to maintain the sections of the sleeve in alignment with one another, it is obvious that other means can be used to accomplish this. For instance, the sleeves can be molded in separate sections with grooves or projections molded into the edges of each section. Furthermore, other types of aligning means can be utilized.

The elastomeric sleeve can be of any suitable natural or synthetic material such as tire tread stock or urethane; reinforced, if necessary, for added strength. It is understood, of course, that reinforcing means must be used which do not prohibit the radial expansion and contraction of the drum. In other words, the sleeve must still have a certain amount of stretch to it. It should be noted, incidentally, that the rubber sleeve assists the various garter springs in collapsing the drum at the end of the tire building cycle, thus facilitating removal of the carcass from the drum.

In certain instances it may be desirable to build a drum having only one width, in which case a one-piece or two-piece sleeve can be used between the novel drum segments of the present invention. Alternatively, the sleeve may be divided into more than three sections when, for instance, the various drum widths differ from one another by equal increments of one inch or so, in which case the intermediate elastomeric sections are also of the same width.

It is understood that the building drum of this invention can be used with other equipment normally associated with tire building drums such as servicing equipment, manual or automatic stitching rollers, and various other transfer equipment. Furthermore, various aspects of the drum can be changed without deviating from the substance of the invention.

For instance, the screw shaft does not have to be coaxial with the hollow drum shaft, but instead may be located outside of the same. Furthermore, gap shields of a different design than those shown may be used. Other changes can also be made without departing from the invention which is limited only by the scope of the following claims.

I claim:

1. In a rotatable, axially adjustable tire building drum supported upon a shaft and having two axially spaced circumferentially extending rows of rigid segments, a screw shaft having two sets of threads of opposite pitch, one row of segments coupled to each set of threads whereupon the rotation of said screw shaft produces a change in the axial spacing between the two rows of segments, a plurality of rigid arcuate gap shields spanning the two rows of segments and cooperating therewith to form a generally cylindrical radially expandable surface, inflatable bladder means underlying the segments to change the diameter of the cylindrical surface, each segment having a projection extending radially beyond said cylindrical surface and cooperating with the projections of the other segments in the same row to form a bead contacting shoulder, the improvement comprising an elastomeric sleeve overlying the cylindrical surface axially between the two rows of projections and defining in cooperation thereof the outer cylindrical surface of the drum, said sleeve composed of three contiguous circumferentially extending resilient bands including a pair of end bands each of which is clamped to one row of projections and a filler band intermediate the two end bands.

2. The drum according to claim 1 wherein each end band of the sleeve has a fabric reinforced circular edge portion held by the clamp means of each of the projections of the segments in one row.

3. The building drum according to claim 1 wherein each of the projections includes clamp means for securing the end band of the sleeve to the respective segments, the radially outer surface of said clamp means terminating flush with the outer surface of the sleeve.

4. The drum according to claim 1 wherein the contiguous edges of the bands of the elastomeric sleeve are provided with axially extending bores, and aligning pins are disposed in said bores.

References Cited

UNITED STATES PATENTS

| | | | |
|---|---|---|---|
| 1,675,130 | 6/1928 | Pfeiffer | 156—416 |
| 2,614,057 | 10/1952 | Ericson et al. | 156—415 X |
| 2,614,952 | 10/1952 | Kraft | 156—416 X |
| 2,979,110 | 4/1961 | Henley | 156—415 |
| 3,044,533 | 7/1962 | Lowe | 156—416 X |
| 3,077,917 | 2/1963 | Appleby | 156—416 |
| 3,125,482 | 3/1964 | Niclas et al. | 156—414 |
| 3,171,769 | 3/1965 | Henley et al. | 156—416 X |
| 3,234,070 | 2/1966 | Pouilloux | 156—416 |

FOREIGN PATENTS 856,513   11/1952   Germany.

HAROLD ANSHER, Primary Examiner

C. B. COSBY, Assistant Examiner

U.S. Cl. X.R.

156—416

PO-1050
(5/69)

UNITED STATES PATENT OFFICE
CERTIFICATE OF CORRECTION

Patent No. 3,476,633                     Dated November 4, 1969

Inventor(s) Virgil E. Henley

It is certified that error appears in the above-identified patent and that said Letters Patent are hereby corrected as shown below:

Column 4, line 54, the numeral "64" should be -- 62 --; line 75, the numeral "64" should be -- 62 --; line 62, the numeral "70" should be -- 90 --; line 64, the numeral "70" should be -- 90 --; line 64, the numeral "72" should be -- 92 --. In Fig. 1, the flange on the left side of the drawing underlying bladder 12 should be renumbered -- 90 -- instead of "70"; the clamp ring "72" which holds this flange to the bladder 12 should be renumbered -- 92 -- .

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents